(12) United States Patent
Joldersma (10) Patent No.: US 9,945,179 B1
(45) Date of Patent: Apr. 17, 2018

(54) REMOVABLE STEP LADDER FOR RECREATIONAL VEHICLE

(71) Applicant: David K. Joldersma, Elkhart, IN (US)

(72) Inventor: David K. Joldersma, Elkhart, IN (US)

( * ) Notice: Subject to any disclaimer, the term of this patent is extended or adjusted under 35 U.S.C. 154(b) by 104 days.

(21) Appl. No.: 14/328,287

(22) Filed: Jul. 10, 2014

Related U.S. Application Data (60) Provisional application No. 61/844,895, filed on Jul. 11, 2013.

(51) Int. Cl.
*E06C 5/24* (2006.01)
*E06C 5/32* (2006.01)
*B60R 3/00* (2006.01)

(52) U.S. Cl.
CPC ............... *E06C 5/24* (2013.01); *B60R 3/007* (2013.01); *E06C 5/32* (2013.01)

(58) Field of Classification Search
CPC .. B60R 3/00; B60R 3/007; B60R 3/02; B60R 3/005; E06C 5/04; E06C 5/24; E06C 5/44; E06C 5/00; E06C 5/02; E06C 5/20; E06C 5/32; E06C 5/42
See application file for complete search history.

(56) References Cited

U.S. PATENT DOCUMENTS

| | | | | | |
|---|---|---|---|---|---|
| 2,794,583 | A | * | 6/1957 | Ernst | B30B 15/0052 182/97 |
| 3,020,972 | A | * | 2/1962 | Hockett | B62B 3/00 182/120 |
| 3,476,211 | A | * | 11/1969 | Cormier | E06C 1/10 182/178.2 |
| 3,556,248 | A | * | 1/1971 | Brown | E06C 5/02 182/15 |
| 3,858,905 | A | * | 1/1975 | Peebles | B60R 3/007 182/106 |
| 4,023,647 | A | * | 5/1977 | Confer | E04H 4/144 182/106 |
| 4,057,125 | A | * | 11/1977 | Kroft | B60R 3/007 182/206 |
| 4,249,683 | A | * | 2/1981 | Park | B62D 43/02 182/129 |
| 4,311,209 | A | * | 1/1982 | Primerano | E06C 1/36 182/107 |

(Continued)

FOREIGN PATENT DOCUMENTS

| | | |
|---|---|---|
| FR | 2729900 A1 | 8/1996 |
| JP | 11292192 A | 10/1999 |
| JP | 2000326794 A | 11/2000 |

*Primary Examiner* — Daniel P Cahn
(74) *Attorney, Agent, or Firm* — Faegre Baker Daniels LLP (57) ABSTRACT

In one embodiment of the invention, a ladder and method for removably mounting the ladder on a recreational vehicle is disclosed. The ladder may be removed and used as a standard step ladder. The ladder includes a top end and two pairs of legs extending downward from the top end. At least one of the pairs of legs is pivotally mounted to the top end, and a pivoting limiting mechanism is provided to allow the pairs of legs to fold adjacent one another or unfold to a use position as a step ladder. An upper mounting arrangement is attached to the recreational vehicle. The arrangement includes two free ends extending downwardly therefrom; and the top end of the ladder includes receivers for receiving free ends of the upper mounting arrangement.

15 Claims, 5 Drawing Sheets

(56) References Cited

U.S. PATENT DOCUMENTS

| | | | | |
|---|---|---|---|---|
| 4,413,801 A * | 11/1983 | Lancaster | ............... | E06C 5/24 224/405 |
| 4,482,029 A * | 11/1984 | Prochaska | ............... | E06C 5/40 182/127 |
| 5,117,940 A * | 6/1992 | Garelick | ............... | E06C 9/10 114/362 |
| 5,282,339 A * | 2/1994 | Devlin | ............... | E02D 29/12 182/106 |
| 5,370,204 A * | 12/1994 | Fox | ............... | E06C 7/42 182/116 |
| 5,927,434 A * | 7/1999 | Wu | ............... | E06C 9/14 182/95 |
| 6,003,633 A * | 12/1999 | Rolson | ............... | E06C 5/02 182/106 |
| 6,105,720 A * | 8/2000 | Kumher | ............... | E06C 5/02 182/127 |
| 6,315,078 B1 * | 11/2001 | Kumher | ............... | E06C 5/02 182/127 |
| 6,321,873 B1 * | 11/2001 | LaBrash | ............... | B60R 3/02 182/127 |
| 6,378,654 B1 * | 4/2002 | Ziaylek, Jr. | ............... | B60R 3/005 182/127 |
| 6,401,861 B1 * | 6/2002 | Marszalek | ............... | B60R 3/02 182/206 |
| 6,942,271 B1 * | 9/2005 | Jamison | ............... | B60R 3/007 14/71.1 |
| 7,066,299 B1 * | 6/2006 | Fleming | ............... | E06C 1/20 182/107 |
| 7,516,997 B2 * | 4/2009 | Kuznarik | ............... | B62D 33/0273 182/127 |
| 7,861,663 B2 * | 1/2011 | Sedlack, II | ............... | B63B 27/146 114/362 |
| 8,393,586 B1 * | 3/2013 | Mercure | ............... | E06C 7/426 182/180.3 |
| 8,839,908 B2 * | 9/2014 | Davis, Jr. | ............... | E06C 7/188 182/106 |
| 8,893,853 B2 * | 11/2014 | Kennedy | ............... | B60R 3/02 182/62.5 |
| 9,334,689 B2 * | 5/2016 | Sautter, Jr. | ............... | B60R 5/04 |
| 2002/0153201 A1 * | 10/2002 | Warford | ............... | E04F 11/025 182/115 |
| 2004/0069566 A1 * | 4/2004 | Bareket | ............... | E06C 5/04 182/97 |
| 2004/0232649 A1 * | 11/2004 | Lambie | ............... | B60R 3/007 280/163 |
| 2005/0039983 A1 * | 2/2005 | Tombarello | ............... | E06C 5/02 182/93 |
| 2005/0126855 A1 * | 6/2005 | Tilley | ............... | E06C 7/48 182/107 |
| 2005/0139559 A1 * | 6/2005 | Trusty | ............... | E06C 1/005 211/113 |
| 2005/0285365 A1 * | 12/2005 | Manser | ............... | B60R 3/02 280/163 |
| 2006/0108179 A1 * | 5/2006 | Sieb | ............... | B60R 3/005 182/127 |
| 2006/0261623 A1 * | 11/2006 | Kuznarik | ............... | B62D 33/0273 296/62 |
| 2006/0272896 A1 * | 12/2006 | Rajewski | ............... | E06C 1/12 182/127 |
| 2008/0087496 A1 * | 4/2008 | Graffy | ............... | E06C 5/02 182/93 |
| 2008/0236947 A1 * | 10/2008 | Lin | ............... | E06C 7/085 182/165 |
| 2008/0277199 A1 * | 11/2008 | Castonguay | ............... | B60R 3/005 182/127 |
| 2009/0020360 A1 * | 1/2009 | May | ............... | B60R 3/02 182/1 |
| 2009/0200108 A1 * | 8/2009 | Rathbone | ............... | E06C 9/12 182/84 |
| 2010/0071994 A1 * | 3/2010 | Tseng | ............... | E06C 1/125 182/27 |
| 2010/0200331 A1 * | 8/2010 | Hager | ............... | E06C 7/14 182/107 |
| 2011/0139544 A1 * | 6/2011 | Frick | ............... | E04F 11/002 182/27 |
| 2013/0292205 A1 * | 11/2013 | Frick | ............... | E06C 1/387 182/156 |

* cited by examiner

REMOVABLE STEP LADDER FOR RECREATIONAL VEHICLE

This application claims priority from U.S. provisional patent application Ser. No. 61/844,895 filed on Jul. 11, 2014, the complete disclosure of which is incorporated herein by reference.

BACKGROUND OF THE INVENTION

This invention relates to a ladder for use with a recreational vehicle, and in particular to a ladder being mountable for access to an upper or roof area of the recreational vehicle and being further removable from the recreational vehicle for use as a standard step ladder.

It is well known to have ladders mounted to or otherwise attached to recreational vehicles. Typically the ladders are mounted at the back end or sides of the recreational vehicle to allow access to the roof. Equipment or other goods may be stored on the roof of the recreational vehicle and access also allows cleaning and maintenance of the roof or any fixtures extending from the roof, such as air conditioning units.

Furthermore, many recreational vehicle owners travel with a step ladder to allow access to the roof of the recreational vehicle at points other than where the ladders are mounted. Step ladders are also used for other purposes, such as at a camp site where access to an elevated position is desired. A problem is that storage space is limited and at a premium in recreational vehicles, so it is difficult to find a suitable and secure place to store the step ladder for travel and while camping. As closet space is limited, some recreational vehicle owners will use straps, ropes, or bungee cords to mount a step ladder to the recreational vehicle's attached ladder or to other areas on the exterior of the recreational vehicle where the ladder might be secured. Such mounting may impair the use of the recreational vehicle's attached ladder, cause an unsightly appearance or cause a hazard if it becomes dislodged during travel. Accordingly, it is desirable to have a combination step ladder that can be attached to and serve as the main ladder of the recreational vehicle for access to the roof thereof and/or is removable for use apart and away from the recreational vehicle.

SUMMARY OF THE INVENTION

In one embodiment of the invention, a ladder and method for removably mounting the ladder on a recreational vehicle is disclosed. The ladder may be removed and used as a standard step ladder. The ladder includes a top end and two pairs of legs extending downward from the top end. At least one of the pairs of legs is pivotally mounted to the top end, and a pivoting limiting mechanism is provided to allow the pairs of legs to fold adjacent one another or unfold to a use position as a step ladder. An upper mounting arrangement is attached to the recreational vehicle. The arrangement includes two free ends extending downwardly therefrom; and the top end of the ladder includes receivers for receiving free ends of the upper mounting arrangement.

The receivers at the top end of the ladder may include apertures therein for receiving the free ends of the upper mounting arrangement, and the free ends can be tubular members of the mounting arrangement.

The tubular members may have a bend and extend outwardly therefrom above the receivers and another bend to extend the tubular members back vertically.

The ladder and method for removably mounting the ladder on a recreational vehicle may further include a lower mounting arrangement that may include an expandable width bracket mounted to the lower end of one pair of the legs on the ladder and extensions mounted to the bottom of the expandable width bracket.

Another bracket may be mounted to the recreational vehicle for receiving the extensions. The bracket mounted on the recreational vehicle may include upwardly extending extensions that connect to the extensions extending downwardly from the expandable width bracket attached to the ladder.

The extensions attached to the bracket on the recreational vehicle may include T-shaped apertures and the extensions extending down from the ladder bracket may include circular apertures. Fasteners may extend through the apertures for connecting the brackets mounted to the ladder and the recreational vehicle together.

The bracket mounted to the recreational vehicle can be mounted on a bumper thereof. Alternately, the bracket attached to the recreational vehicle may be mounted to the back of the recreational vehicle and the extensions may extend backwardly therefrom.

In another embodiment of the invention, the ladder may be removed and used as a standard step ladder. The ladder may include a top end and two pairs of legs extending downward from the top end. At least one of the pairs of legs is pivotally mounted to the top end, and a pivoting limiting mechanism is provided to allow the pairs of legs to fold adjacent one another or unfold to a use position as a step ladder. A lower mounting arrangement for attaching the ladder to the recreational vehicle is also provided. The arrangement includes a first bracket mounted to the bottom of one pair of step ladder legs, a second bracket mounted to the recreational vehicle, and fasteners to connect the brackets together.

One of the brackets may have an expandable width and each of the brackets can include extensions extending therefrom. Each of the extensions may include apertures and one set of apertures can have a T-shaped configuration.

The second bracket can be mounted to a bumper of the recreational vehicle or it can be mounted directly to a rear end of the recreational vehicle.

An upper mounting arrangement may also be provided that includes two free ends extending downwardly therefrom and receivers in the ladder for receiving the free ends of the upper mounting arrangement. The receivers at the top of the ladder may include apertures therethrough for receiving the free ends of the upper mounting arrangement. The free ends may be tubular members of the mounting arrangement.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Figure 1:
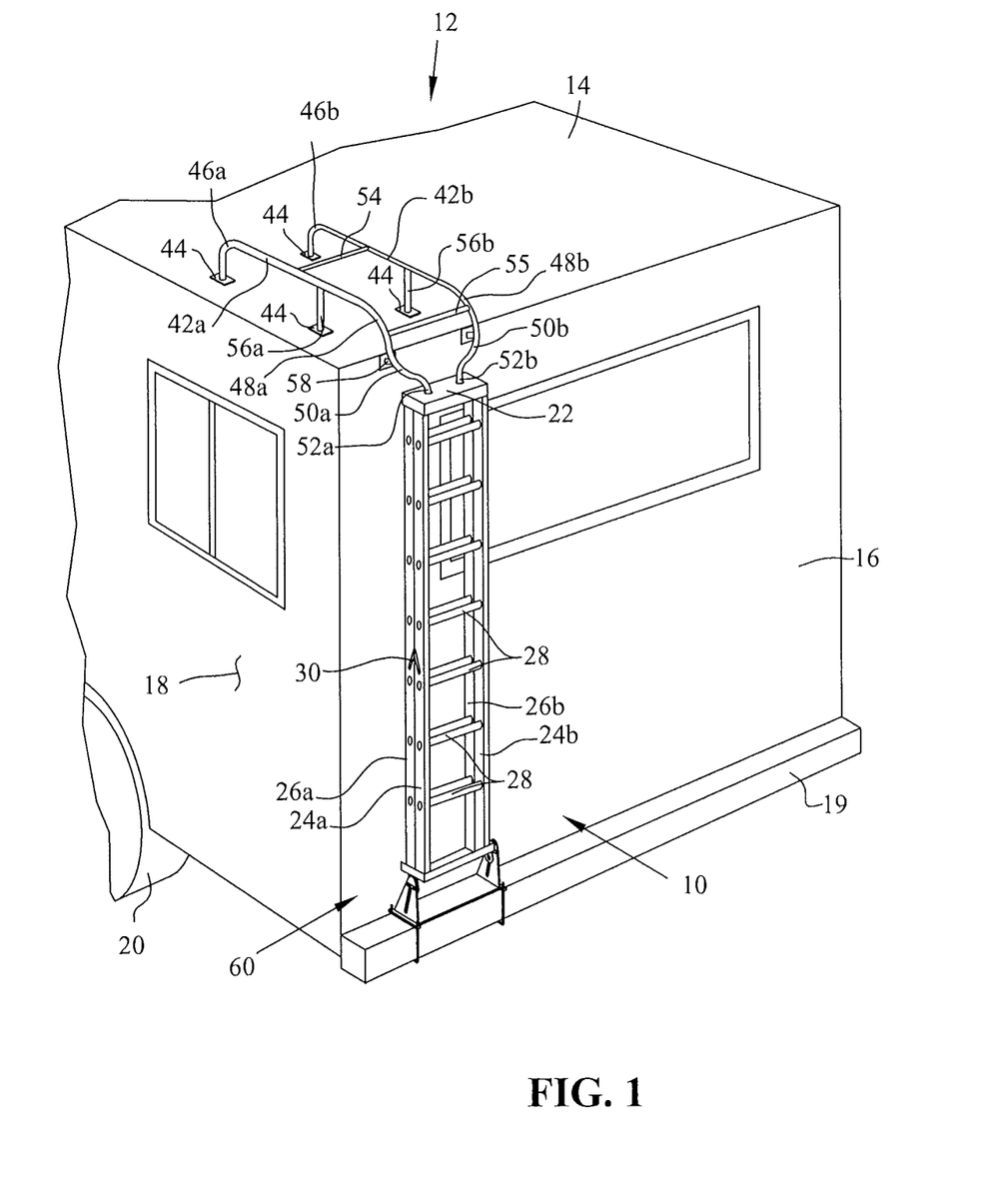
FIG. 1 is a perspective view of one embodiment of the subject invention showing a removable ladder mounted on a recreational vehicle.

Now referring to FIG. 1, a removable ladder, generally indicated as 10, is shown mounted to a recreational vehicle, generally indicated as 12. Recreational vehicle 12 may be of any type or variety of such vehicles as are well known. Recreational vehicle 12 includes a top or roof 14, a rear or back end 16, a side 18, and a plurality of wheels 20 on which recreational vehicle 12 moves. Recreational vehicle 12 also includes a bumper 19 as is well known.

Removable ladder 10 is of a well-known variety and commonly called a step ladder. Such ladders, as is well known, have a top end or platform 22 and two pairs of legs 24a, b, and 26a, b extending downward from top end 22. Receiving holes 23 are provided in top end 22 for purposes discussed below. At least one of the pairs of legs 24a, b or 26a, b are pivotally mounted to platform 22 as is well known to allow the legs to fold up against one another for storage or leaning use as ladder 10 is depicted in FIG. 1, or to pivotally open up to allow ladder 10 to stand freely on its own for use as a step ladder. Ladder 10 further includes horizontal rungs or steps 28 extending between legs 24a and 24b and a pair of pivoting limit stops 30 attached to and connecting legs 24a to 26a and 24b to 26b, as is well known.

To facilitate mounting removal ladder 10 to recreational vehicle 12, an upper mounting arrangement is shown, generally indicated as 40, and a lower mounting arrangement is shown, generally indicated as 60.

Upper mounting arrangement 40 includes a pair of tubular members 42a, 42b, mounted generally parallel and adjacent to one another. Upper mounting arrangement 40 may be manufactured from aluminum members or other suitable corrosion resistant materials. One end of tubular members 42a, b has flanges 44 attached thereto, such as by welding or other known means. Flanges 44 may include holes and be attached using fasteners or other known means to roof 14 of recreational vehicle 12. Each tubular member 42a, 42b extends generally vertically upward from flange 44/roof 14, but further includes respective bends 46a, 46b. At the rear end 16 of recreational vehicle 12, tubular members 42a, b include 90° bends 48a, 48b, respectively, directing tubular members downwardly out over rear end 16. Tubular members 42a, 42b include additional bends 50a, 50b, respectively, bending tubular members 42a, 42b towards one another at approximately a 45° angle. Tubular members 42a, 42b include one additional bend each 52a, 52b, respectively, wherein the tubular members bend back vertically again and parallel to one another, ending in parallel free ends 53a, b, respectively.

Upper mounting arrangement 40 further includes two generally horizontal cross supports 54 and 55 extending between and attached to tubular members 42a, 42b. Supports 54 and 55 may be welded to or otherwise attached to tubular members 42a, 42b in a known manner. Upper mounting arrangement 40 further includes vertical supports 56a, 56b, attached to tubular members 42a, 42b, respectively. Vertical supports 56a, 56b may be welded or attached to tubular members in any known manner, and may further include flanges 44 attached to the bottom end thereof and having holes for mounting the supports to roof 14 using fasteners or other known means (not shown). Upper mounting arrangement 40 also includes supports 58 attached to horizontal support 55 or tubular members 42a, 42b and extending to rear end 16. A flange 44 is also attached to the end of support 58 mounted to rear end 16. Fasteners or other suitable means (not shown) may be used to attach the flange to rear end 16 in a manner well known.

Figure 4:
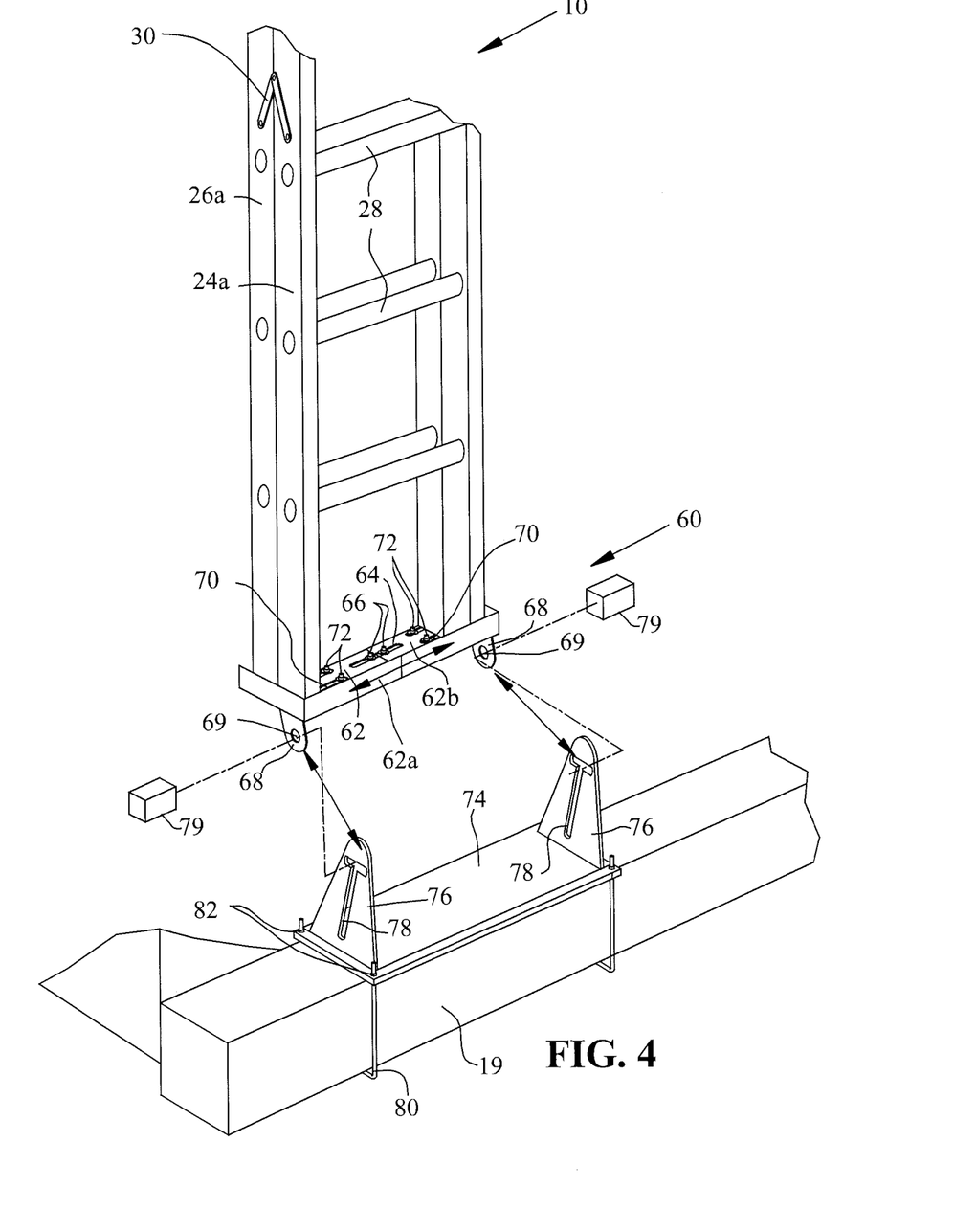
FIG. 4 shows one embodiment for mounting the lower end of the ladder to a bumper of a recreational vehicle.

Lower mounting arrangement 60 is best shown in FIG. 4 and in the embodiment shown, includes an expandable width bracket 62 mounted to legs 24a, 24b. One embodiment for expandable bracket 62 includes overlapping bracket portions 62a, 62b, having a slot 64, wherein the halves may be fixed at a desired width with fasteners 66. Bracket 62 further includes downwardly extending extensions 68 which may be fixedly fastened or otherwise attached to bracket 62 and having apertures 69 extending through lower ends thereof. Extensions 68 may be attached to slots 70 in bracket 62 with fasteners 72.

Figure 5:
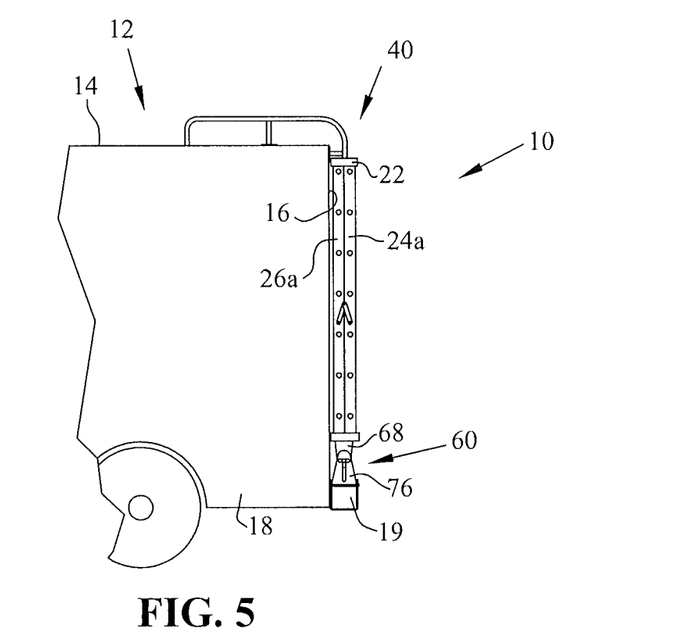
FIG. 5 is a side view showing the lower end of the ladder mounted to the bumper in a manner consistent with FIG. 4.

Lower mounting arrangement 60 further includes a second bracket 74 including extensions 76 extending upwardly therefrom. Each extension 76 includes a generally T-shaped aperture 78, which is configured for mounting extension 76 to extension 68 using fasteners schematically depicted as 79 in FIG. 4. The T-shaped apertures in extensions 76 permit a flexible mounting arrangement between brackets 62 and 74. Bracket 74 is mounted to bumper 19 using U-bolts 80 and fasteners 82. FIG. 5 shows a side view with extensions 68 connected to extensions 76.

Figure 6:
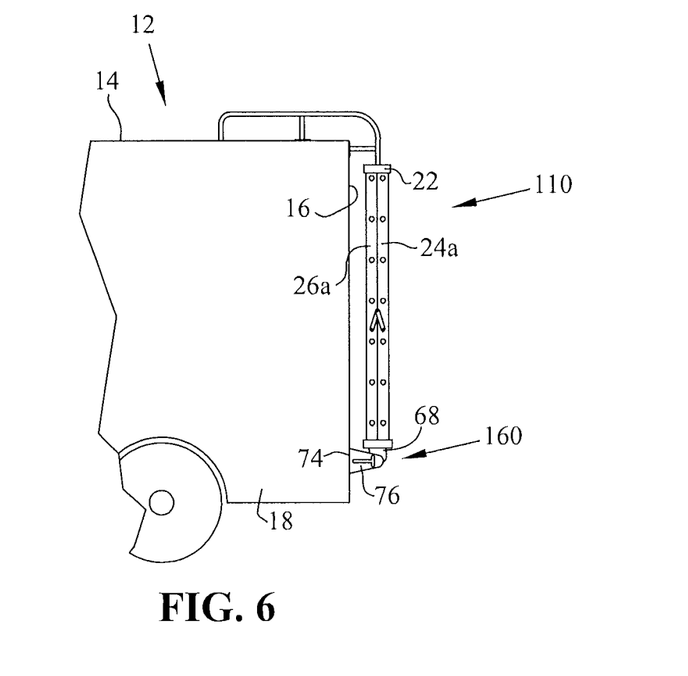
FIG. 6 shows an alternate embodiment arrangement of mounting the lower end of the ladder to a recreational vehicle without a bumper.

FIG. 6 shows an alternate embodiment ladder and mounting arrangement 110, wherein recreational vehicle 12 does not include a bumper 19. In this arrangement, bracket 74 is mounted directly to rear end 16 using fasteners or other known means (not shown) so that extensions 76 extend backwardly perpendicular to rear end 16. Extensions 76 meet extensions 68 at approximately a 90° angle with T-shaped apertures 78 being matched to apertures 69 and held together with fasteners.

Figure 2:
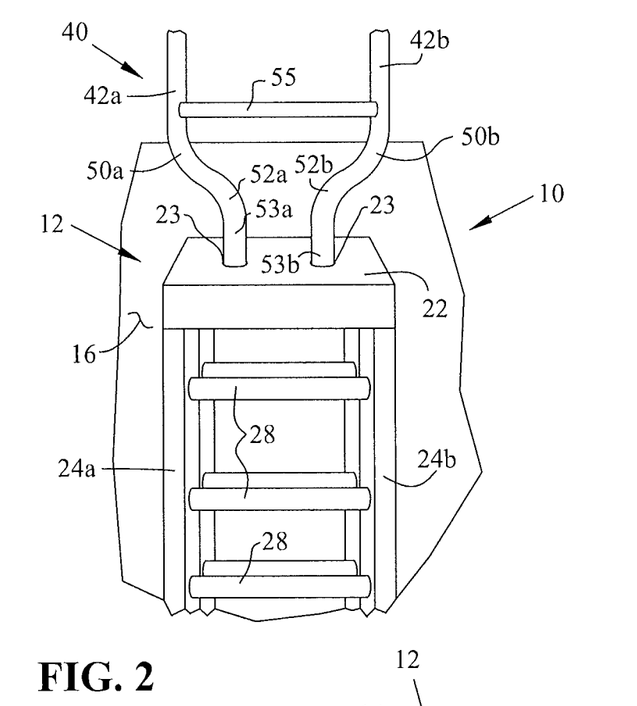
FIG. 2 is an end view of an upper portion of the ladder of FIG. 1 as mounted on the recreational vehicle.
Figure 3:
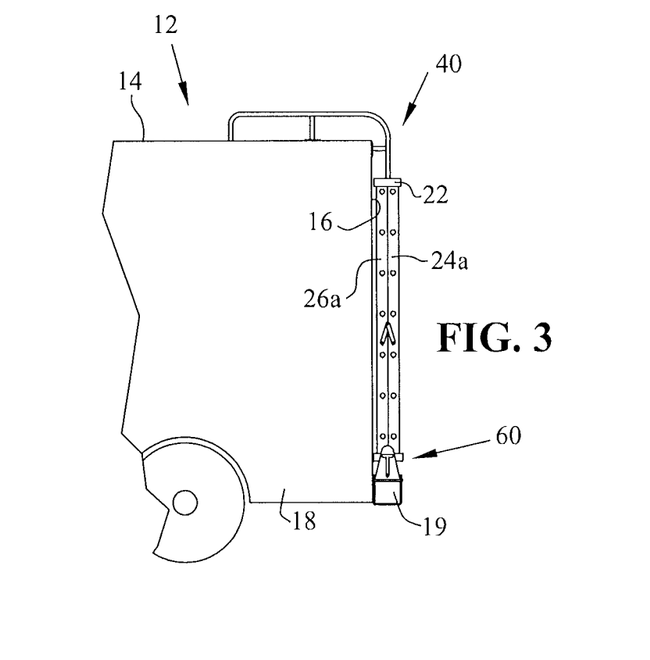
FIG. 3 is a side view of the ladder on the recreational vehicle from FIG. 1.

To mount ladder 10 on recreational vehicle 12, the width of bracket 62 is adjusted to correspond with the width of ladder legs 24a, 24b and fixed using fasteners 66 in slot 64. Bracket 74 is attached to bumper 19 using a U-bolt 80 and fasteners 82 as shown in FIG. 4. Free ends 53a and 53b of tubular members 42a, 42b are then inserted into receiving holes 23 of top end 22 as best shown in FIG. 2. At this point, the lower ends of legs 24a and 24b are positioned within the sides of bracket 62 and extensions 68 of bracket 62 are connected to extensions 76 of bracket 74 using fasteners 79 or other known means to securely connect the extensions together. As should be appreciated, the T-shaped configuration of apertures 78 enables the extensions to be connected together and allow for adjustments to be made if the fit-up does not match perfectly.

To remove the ladder, the fasteners 79 connecting extensions 68 and 76 together are removed, bracket 62 is removed from the bottom of step ladder 10 and top end 22 is drawn down so that free ends 53a, b of tubular members 42a, b, respectively, are withdrawn from receiving holes 23. Ladder 10 can then be opened up and used in a manner of a normal step ladder as is well known. The ladder can be reattached by reversing the process.

Figure 7:
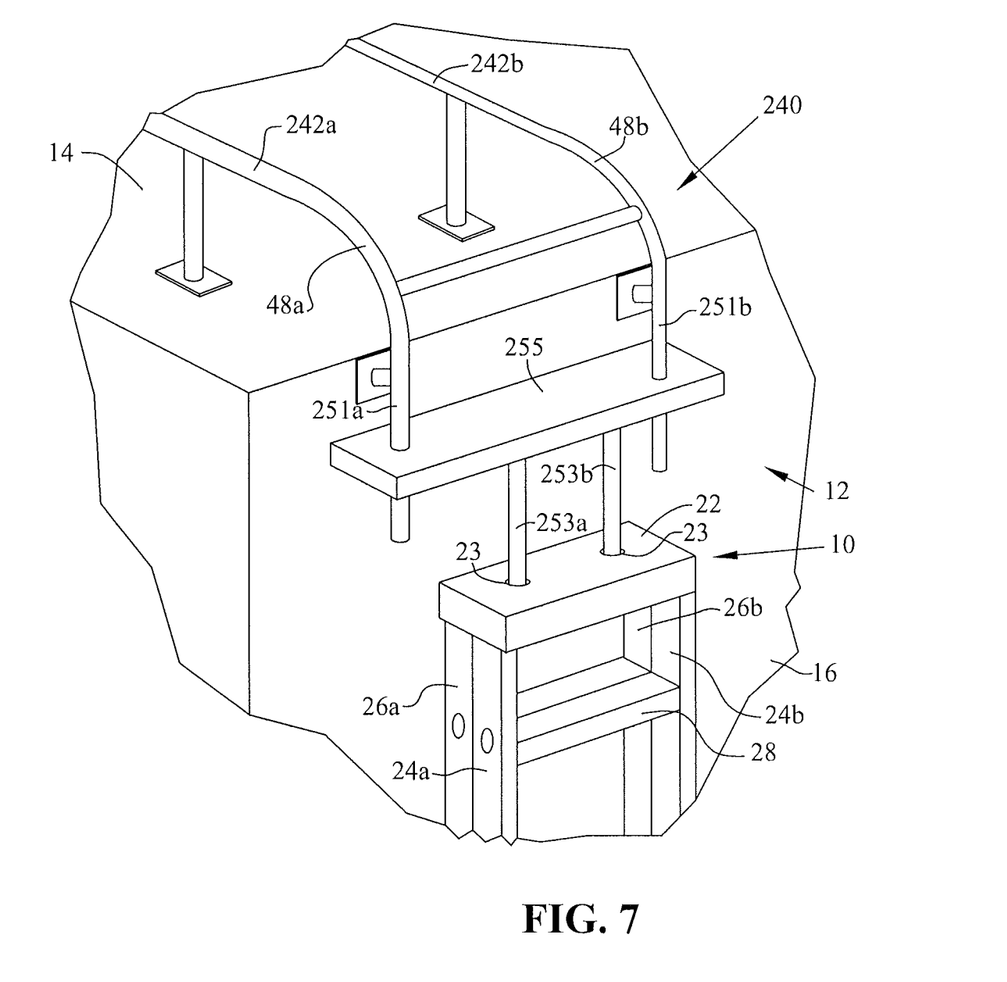
FIG. 7 is a perspective view of an alternate embodiment upper mounting arrangement as mounted on the recreational vehicle.

Referring now to FIG. 7, an alternate embodiment upper mounting arrangement is shown generally indicated as 240. The removable ladder 10 attached to upper mounting arrangement 240 is the same as depicted in FIGS. 1-6. Additionally, upper mounting arrangement 240 can be the same as upper mounting arrangement 40, forward from 90° bends 48a, 48b; however, upper mounting arrangement 240 does not include any bends in tubular members 242a, 242b below bends 48a, 48b. Instead, mounting arrangement 240 includes two vertical segment tubular portions 251a, 251b. Vertical portions 251a, 251b are attached to a horizontal step or support 255. Attached to the bottom of step 255 are vertical tubular portions 253a, 253b, which have free ends configured to extend into and be received by receiving apertures 23 in top end 22 of removable ladder 10. Removeable ladder 10 is attached to upper mounting arrangement 240 in the same or similar manner as with upper mounting arrangement 40, and can be removed in the same or similar manner.

It should be appreciated that as an alternative, vertical portions 253a and 253b can be attached to removable step ladder 10, and step 255 may include receiving apertures for receiving either free lower ends of vertical portions 251a, 251b or free upper ends of vertical portions 253a, 253b as an alternate means of mounting removable step ladder 10 to upper mounting arrangement 240.

While the invention has been taught with specific reference to these embodiments, one skilled in the art will recognize that changes can be made in form and detail without departing from the spirit and scope of the invention. For example, bracket 62 does not have to have an adjustable width or other adjustment configurations may be used. Also, receiving apertures 23 may be replaced with sockets attached to top end 22. The described embodiments are to be considered, therefore, in all respects only as illustrative and not restrictive. As such, the scope of the invention is indicated by the following claims rather than by the description.

The invention claimed is:

1. A ladder and recreational vehicle combination, the ladder removably mountable on the recreational vehicle, wherein the ladder is a foldable step ladder, the combination comprising:
   the ladder including a top end and two pairs of legs extending downward from the top end, at least one of the pairs of legs being pivotally mounted to the top end, and a pivoting limiting mechanism allowing the pairs of legs to fold adjacent one another or unfold to a use position;
   an upper mounting arrangement attached to the recreational vehicle, the arrangement including at least one horizontal ladder rung and two free ends extending downwardly therefrom; and
   the top end of the ladder having a generally planar horizontal top stepping surface including holes extending therethrough configured to receive the free ends of the upper mounting arrangement.

2. The ladder and recreational vehicle combination as set forth in claim 1, wherein the free ends are tubular members of the mounting arrangement.

3. The ladder and recreational vehicle combination as set forth in claim 2, wherein the tubular members have a bend and extend outwardly therefrom above the holes and another bend to extend the tubular members back vertically.

4. The ladder and recreational vehicle combination as set forth in claim 1, further including a lower mounting arrangement including a first bracket mounted to lower ends of a first pair of said two pairs of legs on the ladder, the first bracket extending completely across a distance between said first pair of said two pairs of legs to which the first bracket is mounted.

5. The ladder and recreational vehicle combination as set forth in claim 4, including extensions mounted to a bottom of the first bracket.

6. The ladder and recreational vehicle combination as set forth in claim 5, including a bracket mounted to the recreational vehicle connected to the extensions extending from the first bracket that is mounted to the lower ends of the first pair of said two pairs of legs.

7. The ladder and recreational vehicle combination as set forth in claim 6, wherein the bracket mounted on the recreational vehicle includes upwardly extending extensions that connect to the extensions extending downwardly from the first bracket attached to the ladder.

8. The ladder and recreational vehicle combination as set forth in claim 7, wherein the upwardly extending extensions attached to the bracket mounted on the recreational vehicle include T-shaped apertures and the extensions extending downwardly from the first bracket include circular apertures.

9. The ladder, and recreational vehicle combination as set forth in claim 8, including fasteners extending through the apertures and the extensions for connecting the brackets mounted to the ladder and to the recreational vehicle together.

10. The ladder and recreational vehicle combination as set forth in claim 9, wherein the bracket mounted to the recreational vehicle is mounted on a bumper thereof.

11. The ladder and recreational vehicle combination as set forth in claim 6, wherein the bracket mounted to the recreational vehicle is mounted to a back end of the recreational vehicle and includes extensions extending backwardly therefrom.

12. A ladder and mounting assembly combination, removably mountable on a recreational vehicle, wherein the ladder is a foldable step ladder, the combination comprising:
   the ladder including a top end and two pairs of legs extending downward from the top end, at least one of the pairs of legs being pivotally mounted to the top end, and a pivoting limiting mechanism allowing the pairs of legs to fold adjacent one another or unfold to a use position;
   a lower mounting arrangement configured to attach the ladder to a recreational vehicle, the arrangement including a first bracket mounted to bottom ends of one of the pairs of legs, and a second bracket configured to mount to a recreational vehicle, each of the brackets including extensions extending therefrom with each of the extensions having an aperture, and wherein two of the apertures have an open T-shaped configuration including a first elongated open portion and a second elongated open portion intersecting and extending generally perpendicular to said first elongated portion; and fasteners to connect the brackets together.

13. The ladder and mounting assembly combination as set forth in claim 12, wherein the second bracket is configured to be mounted to a bumper of a recreational vehicle.

14. The ladder and mounting assembly combination as set forth in claim 12, wherein the second bracket is configured to be mounted directly to a rear end of a recreational vehicle.

15. The ladder and mounting assembly combination as set forth in claim 12, further including an upper mounting arrangement including a ladder rung and two free ends extending downwardly therefrom and receivers in the ladder for receiving the two free ends of the upper mounting arrangement.

\* \* \* \* \*